(12) United States Patent
Sempliner

(10) Patent No.: US 6,948,879 B2
(45) Date of Patent: Sep. 27, 2005

(54) SLIDE LOCK SYSTEM FOR DOVETAIL AND OTHER TRACKS

(75) Inventor: Arthur T. Sempliner, Douglaston, NY (US)

(73) Assignee: Masters of Branding, Inc., New York, NY (US)

( * ) Notice: Subject to any disclaimer, the term of this patent is extended or adjusted under 35 U.S.C. 154(b) by 144 days.

(21) Appl. No.: 10/646,200

(22) Filed: Aug. 21, 2003

(65) Prior Publication Data

US 2005/0089367 A1  Apr. 28, 2005

Related U.S. Application Data

(60) Provisional application No. 60/404,962, filed on Aug. 21, 2002.

(51) Int. Cl.[7] .................................................. F16D 1/00
(52) U.S. Cl. ...................................... 403/381; 403/373
(58) Field of Search ................................ 403/381, 373, 403/374.5, 322.4, 321, 367, 363

(56) References Cited

U.S. PATENT DOCUMENTS

| | | | | |
|---|---|---|---|---|
| 2,759,574 A | * | 8/1956 | Miller .................... | 403/363 X |
| 3,436,047 A | * | 4/1969 | Foltz ...................... | 403/363 X |
| 3,900,269 A | * | 8/1975 | Pavlot .................... | 403/363 X |
| 4,249,355 A | * | 2/1981 | Anderson et al. ....... | 403/381 X |

\* cited by examiner

*Primary Examiner*—John R. Cottingham
(74) *Attorney, Agent, or Firm*—Schweitzer Cornman Gross & Bondell LLP

(57) ABSTRACT

A mechanism for secure engagement of slideable elements in dovetail or similar tracks. The mechanism comprises a pair of plate-like clamping elements adapted to be received within a slide track. The plates are disposed in non-engaging face-to-face relation having a spacer element positioned therebetween adjacent lower edges of the plates. The lower edges project outwardly in relation to the spacer at an angle to engage interior sidewalls of a slide track. A lever element is adapted to converge the upper portions of the plates in a direction towards the spacer and thereby force the lower edges securely against the slide track. The spacer element can be rotatably mounted and can have a non-circular cross section to facilitate installation and removal of the mechanism.

9 Claims, 2 Drawing Sheets

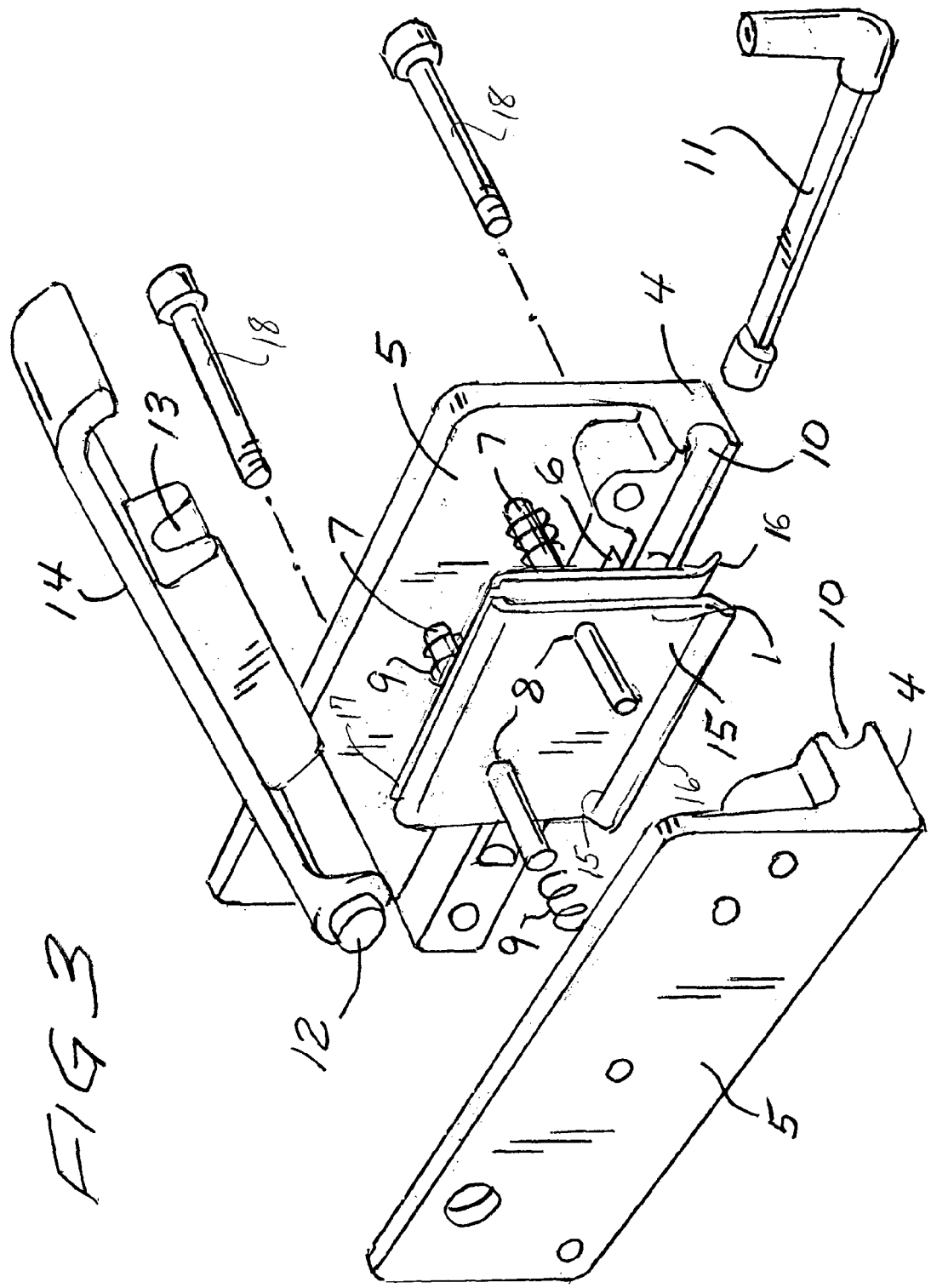

SLIDE LOCK SYSTEM FOR DOVETAIL AND OTHER TRACKS

RELATED APPLICATION

This application is related to and claims the priority of Provisional Application No. 60/404,962, filed Aug. 21, 2002.

BACKGROUND OF THE INVENTION

Most working systems for locking slideable elements in dovetail and similar tracks and utilize a force at 90 degrees to the track and operate to pull a slideable carriage block tightly against the track to accomplish a lock. This requires that the carriage block be able to resist compression and that it be extremely sturdy.

SUMMARY OF THE INVENTION

The system of the invention develops its clamping pressure against the insides of the slide track and does not require a heavy carriage block or housing. The new system utilizes special plate-like clamping elements associated with a fulcrum element. First portions of the clamping elements engage the inner walls of the slide track while second portions, lying on opposite sides of the fulcrum element from the first portions, provide lever arms which, when squeezed toward each other, cause great pressure to be applied to the sides of the slide track by the first portions of the clamping elements.

For a more complete understanding of the above and other features and advantages of the invention, reference should be made to the following detailed description of preferred embodiments of the invention and to the accompanying drawings.

DESCRIPTION OF THE DRAWINGS

FIG. 3 is an exploded view illustrating a practical form of slide lock device constructed according to the principles of the invention.

DESCRIPTION OF PREFERRED EMBODIMENTS

Figure 1:
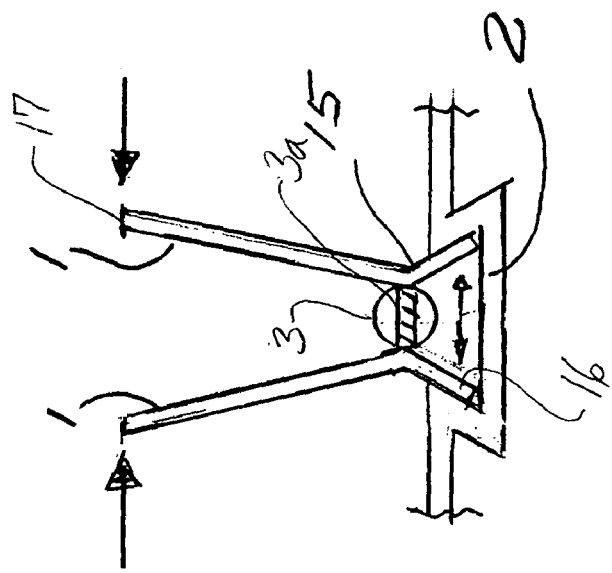
FIG. 1 is a simplified perspective view of a basic form of slide lock mechanism according to the invention.

The new system, in its most basic form, shown in FIG. 1, consist of two opposed clamping plates 1 which are bent outwards at 15 adjacent their lower edge portions. These clamping plates are disposed with their bent lower edges 16 inside a dovetail or similar track so that their lower edges conform generally to the angle of the side walls of the track 2. The track need not be strictly dovetail in section but will have spaced apart side walls and a restricted opening as a characteristic of a dovetail track. Positioned close to the two bends 15 is a spacer 3 which holds the plates apart and in contact with the two sides of the track 2. When the top edges of the plates are pinched together, tremendous force is exerted outward against the sides of the track by the lower edges 16 of the plates. Leverage is exerted in the ratio of the distance (a) from the lower edges 16 to the spacer 3, to (b) the distance from the spacer 3 to the top edges 17 of the plates, where the clamping force is applied.

Figure 2:
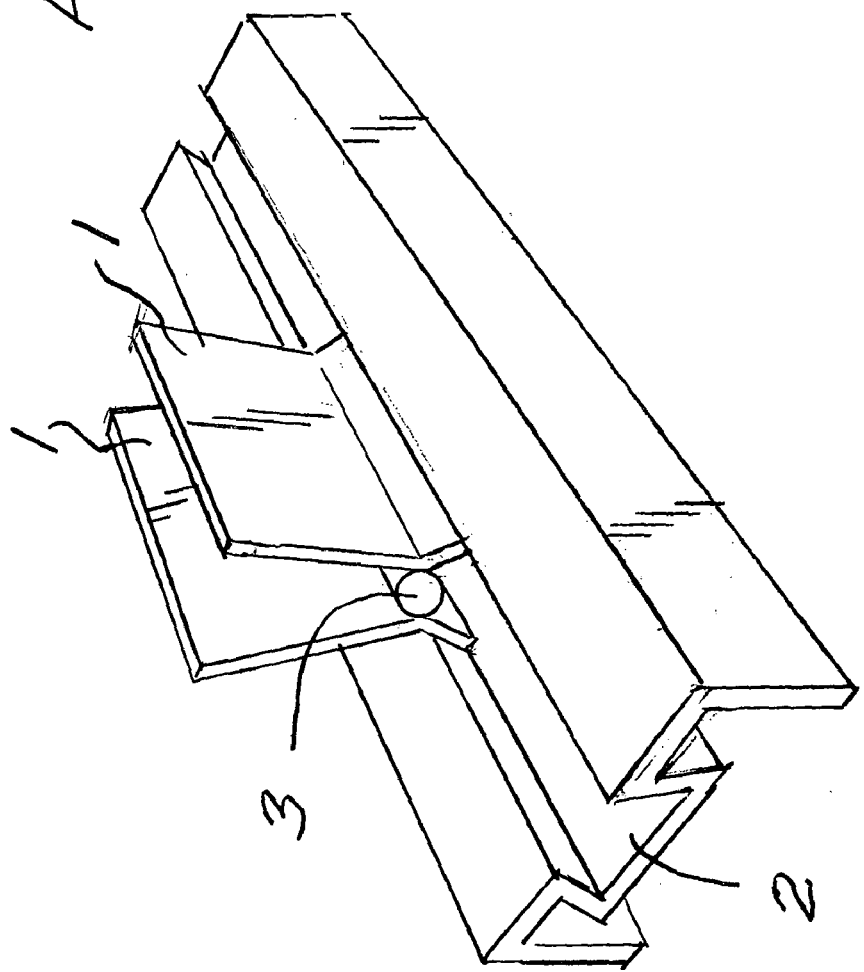
FIG. 2 is a fragmentary cross sectional view as taken generally on line 2—2 of FIG. 1.

To advantage, the spacer member, in the region thereof between the bends 15 has a greater dimension in one direction than the other, as indicated at 3a in FIG. 2. When the spacer is oriented with its wider dimension disposed crosswise relative to the bends 15, in the orientation shown in FIG. 2, the clamping plates are spaced apart such that pressure applied at the upper ends of the clamping plates will cause the lower portions 16 to press outwardly against side walls of the dovetail track in the manner desired. When the spacer is rotated 90 degrees, the clamping plates can move closer together, to facilitate installation and removal from the dovetail track.

An advantageous and illustrative practical embodiment of the invention, shown in FIG. 3, is a clamp for attaching an object, such as a display device, a vertical extrusion with dovetail slots, as used in retail displays. In this embodiment, the two clamping plates 1 are bent at 15 along their lower edges to conform to angled sides of the dovetail slot 2.

The system, as shown in the exploded view of FIG. 3, consists of a chassis comprised of opposed floor plates 4 and side walls 5. The floor plates are formed with vertical notches 6 through which the two clamping plates 1 pass, leaving their bent lower edges 16 protruding below the bottoms of the floor plates. Two small support rods 7 are rigidly affixed to the side walls 5, passing from one wall to the other and passing through two holes 8 provided in the clamping plates. Opposed pairs of helical centering springs 9 may be positioned on the support rods to center the plates between the side walls 5. Bolts 18 secure the chassis parts tightly together.

A longitudinal circular channel 10 (one half in each chassis section) extends from the one end of the floor plates 4 and continues forward past the clamping plates 1 and the longitudinal slot 6 into the floor plates. The centerline of this longitudinal channel passes centrally between the floor plates, just above the bottoms of the floor plates. A rotatable rod 11 formed with cylindrical ends and a central portion of generally rectangular cross section, is placed in this channel 10, supported by its cylindrical ends. When the rod 11 is rotated so its wider side faces upwardly (as viewed in FIG. 3), the clamping plates are spread apart such that their lower edges contact the side walls of the dovetail track. In this position, the plates will not come out of the track but will allow the assembly to be moved longitudinally up and down the track. When the rod is rotated 90 degrees to put its narrow side facing upward, the plates 1 are allowed to move inward, encouraged by the centering springs 7. In the inward position, the plates 1 can clear the track and allow the assembly to be removed from the dovetail track.

At the forward end of the assembly, at or near the height of the tops of the clamping plates, an axle 12 passes from one side plate 5 to the other. A locking lever 14 pivots on this axle. Along the bottom of the locking lever, there is a longitudinally extending U-shaped channel 13 positioned so that, when the lever is lowered to a horizontal position, the U-shaped channel engages the tops of the two clamping plates 1. The purpose of this slot or channel 13 is to pinch the tops of the two clamping plates 1 together. If the plate tops are bent inward to form ramps, as shown in FIG. 3, then a channel with parallel sides will compress them. If the tops of the clamping plates are straight, the channel 13 will have to have a tapered section. In either case, when the lever is brought to the horizontal position, the tops of the plates will be forced together, exerting inward pressure on the rectangular bar and outward pressure on the lower edges 16 of the clamping plates, locking the assembly tightly onto the dovetail track.

The device of the invention is particularly advantageous in enabling effectively high clamping forces to be applied in order to lock slideable fixtures in a dovetail slot or the like. Conventional slide lock mechanisms typically have clamping force applied directly outward, to clamp portions of the channel section between internal and external parts of the clamping mechanism. In the device of the present invention, on the other hand, the primary clamping force is in a lateral direction, laterally outward against side walls of the slide channel. This allows much greater effective clamping forces to be applied, since the clamping forces are in a more effective direction, and high mechanical advantages are easily achieved for applying significant clamping forces.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

What is claimed is:

1. A clamping mechanism securing a slideable member to a slide track, wherein the slide track has a channel with spaced apart side walls, a bottom and an open top, and having a width at the bottom greater than a width at the top to form a restricted entrance opening, which comprises
   (a) a pair of opposed clamping elements adapted to be received through said restricted entrance and having inner end portions thereof engageable with portions of said side walls spaced farther apart than at said entrance,
   (b) a support body for movably supporting said clamping elements with said inner end portions thereof exposed for reception in said slide track channel,
   (c) a fulcrum element positioned between and engaging said opposed clamping elements closely adjacent the inner end portions thereof,
   (d) outer portions of said clamping elements extending outward from said fulcrum element for a predetermined distance, and
   (e) means for applying closing pressure to the outer portions of said clamping elements to forcibly urge the inner portions thereof to pivot outwardly against side wall portions of said slide track channel to lock said mechanism against sliding movement in said channel.

2. A mechanism securing engagement of slideable elements in a slide track having sidewalls with inner portions thereof spaced farther apart than outer portions thereof comprising
   (a) a pair of clamping plate elements disposed in face-to-face relation and having upper and lower portions and a pivot between said upper and lower portions;
   (b) said clamping plate elements having lower edges adapted to project outwardly at a predetermined angle to engage it inner portions of said sidewalls of said slide track; and
   (c) a means adapted to forcibly converge upper portions of said clamping plate elements towards one another to forcibly urge said lower edges securely outward against the inner portions of said sidewalls.

3. A mechanism according to claim 2, wherein said pivot is a spacer element positioned between said clamping plate elements at a predetermined distance adjacent to said lower edges.

4. A mechanism according to claim 3, wherein
   (a) said spacer element comprises a wider portion and a narrow portion, and
   (b) said spacer element is rotatably mounted between said clamping plate elements to facilitate installation and removal of said mechanism.

5. A mechanism according to claim 3, wherein a lever means is pivotally movable into a position to engage and converge said upper portions.

6. A clamping mechanism for securing a slideable member to a slide track, wherein the slide track has a channel with a restricted entrance opening and spaced apart side walls, which comprises
   (a) a pair of opposed clamping elements adapted to be received through said restricted entrance and having inner end portions engageable with said sidewalls,
   (b) a support body for movably supporting said clamping elements with said inner end portions thereof exposed for reception in said slide track channel,
   (c) a fulcrum element positioned between and engaging said opposed clamping elements closely adjacent the inner end portions thereof,
   (d) outer portions of said clamping elements extending outward from said fulcrum element for a predetermined distance, and
   (e) means for applying closing pressure to the outer portions of said clamping elements to forcibly urge the inner portions thereof outwardly against sidewall portions of said slide track channel,
   (f) said fulcrum element including first portions engaging said clamping elements and second portions supported in said support body,
   (g) said first portions being of non-circular shape and said second portions being of generally circular shape.

7. A clamping mechanism according to claim 6, wherein
   (a) said support body comprises a floor plate portion and a pair of spaced apart, outwardly extending sidewalls,
   (b) said clamping elements being supported between said side walls and having portions extending through and beyond said floor plate portion, and
   (c) the circular second portions of said fulcrum element being rotatably supported in said floor plate portion.

8. A clamping mechanism according to claim 7, wherein
   (a) a locking lever is pivotally mounted on said support body, in a position generally outward of said clamping elements and being pivotable into a position contacting said clamping elements, and
   (b) said locking lever having surfaces engaging outer portions of said clamping elements for urging said outer portions in a closing direction upon pivoting movements of said locking lever in a direction toward said clamping elements.

9. A clamping mechanism securing a slideable member to a slide track, wherein the slide track has a channel with a restricted entrance opening and spaced apart side walls, which comprises
   (a) a pair of opposed clamping elements adapted to be received through said restricted entrance and having inner end portions engageable with said sidewalls,
   (b) a support body for movably supporting said clamping elements with said inner end portions thereof exposed for reception in said slide track channel,
   (c) a fulcrum element positioned between and engaging said opposed clamping elements closely adjacent the inner end portions thereof,
   (d) outer portions of said clamping elements extending outward from said fulcrum element for a predetermined distance, and (e) means for applying closing pressure to the outer portions of said clamping elements to forcibly urge the inner portions thereof outwardly against side wall portions of said slide track channel, (f) said fulcrum element comprising a wider portion and a narrower portion, and (g) said fulcrum element being rotatably mounted in said support body for selectively positioning said wider or narrower portions between said clamping elements.

* * * * *